US012809528B2

(12) United States Patent
Xia et al.

(10) Patent No.: US 12,809,528 B2
(45) Date of Patent: Nov. 24, 2026

(54) DEVICE FOR AND METHOD OF STORING DATA

(71) Applicant: SAMSUNG ELECTRONICS CO., LTD., Suwon-si (KR)

(72) Inventors: Jing Xia, Xi'an (CN); Lan Gao, Xi'an (CN); Jinhwan Park, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/013,144

(22) Filed: Jan. 8, 2025

(65) Prior Publication Data

US 2026/0111121 A1 Apr. 23, 2026

(30) Foreign Application Priority Data

Oct. 17, 2024 (CN) ......................... 202411457405.8

(51) Int. Cl.
*G06F 3/06* (2006.01)

(52) U.S. Cl.
CPC .......... *G06F 3/0619* (2013.01); *G06F 3/0649* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004;
(Continued)

(56) References Cited

U.S. PATENT DOCUMENTS 6,871,272 B2 * 3/2005 Butterworth .......... G06F 3/0689 711/112
9,324,367 B1 4/2016 Ku et al.
(Continued)

FOREIGN PATENT DOCUMENTS

CN 107735774 A 2/2018

OTHER PUBLICATIONS

Y. Xu, et al., "LeanKV: Efficient Garbage Collection for LSM-Based Key-Value Stores on ZNS SSDs through Lifetime-Based SSTable Clustering," 2023 IEEE 29th International Conference on Parallel and Distributed Systems (ICPADS), 2023, pp. 1895-1902, doi: 10.1109/ICPADS60453.2023.00260. (Year: 2023).*

*Primary Examiner* — Daniel C. Chappell
(74) *Attorney, Agent, or Firm* — Sughrue Mion, PLLC

(57) ABSTRACT

A data storage device and a method of operating same are provided. The method includes: based on identifying that first data stored in a first erasing and writing unit is to be moved, identifying a second erasing and writing unit as a destination for the first data; and moving the first data from the first erasing and writing unit to the second erasing and writing unit, wherein a life cycle of second data stored in the second erasing and writing unit is the same as a life cycle of the first data stored in the first erasing and writing unit.

20 Claims, 12 Drawing Sheets

(58) Field of Classification Search
CPC ........ G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00
See application file for complete search history.

(56) References Cited

U.S. PATENT DOCUMENTS

| | | | | |
|---|---|---|---|---|
| 10,996,863 | B1 | 5/2021 | Kuzmin et al. | |
| 11,294,588 | B1 | 4/2022 | Miller et al. | |
| 2002/0087822 | A1 * | 7/2002 | Butterworth .......... | G06F 3/0689 711/170 |
| 2014/0136752 | A1 * | 5/2014 | Terada .................. | G06F 3/0616 711/102 |
| 2016/0098213 | A1 * | 4/2016 | Franceschini ......... | G06F 3/0679 711/103 |
| 2019/0205040 | A1 * | 7/2019 | Gao ...................... | G06F 3/0679 |
| 2021/0048962 | A1 | 2/2021 | Karkra et al. | |
| 2023/0176743 | A1 | 6/2023 | Dalmatov | |
| 2023/0259275 | A1 | 8/2023 | Meister et al. | |

* cited by examiner

DEVICE FOR AND METHOD OF STORING DATA

CROSS-REFERENCE TO RELATED APPLICATION

This application is based on and claims priority to Chinese Patent Application No. 202411457405.8, filed on Oct. 1, 2024, the disclosure of which is incorporated by reference herein in its entirety.

BACKGROUND

1. Field

The present disclosure relates to the storage field, and more specifically, to a device for and a method of storing data.

2. Description of Related Art

Recently, storage devices (such as Solid State Drive (SSD), Non-Volatile Memory Express (NVMe), Embedded Multi Media Card (eMMC), Universal flash memory (UFS) etc.) have been widely used. During the use of the storage devices, different data is often mixed and stored in an erasing and writing unit, which may lead to longer reclaim times in the erasing and writing unit, exacerbate data migration for Garbage Collection (GC), and lead to greater write amplification.

SUMMARY

Provided is a device for and a method of storing data.

According to an aspect of the disclosure, a method of storing data includes: based on identifying that first data stored in a first erasing and writing unit is to be moved, identifying a second erasing and writing unit as a destination for the first data; and moving the first data from the first erasing and writing unit to the second erasing and writing unit, wherein a life cycle of second data stored in the second erasing and writing unit is the same as a life cycle of the first data stored in the first erasing and writing unit.

According to an aspect of the disclosure, a data storage device includes: a storage apparatus comprising a first erasing and writing unit and a second erasing and writing unit, wherein the first and the second erasing and writing units are configured to store data; at least one processor; and at least one memory storing one or more instructions, wherein the one or more instructions, when executed by the at least one processor, are configured to cause the data storage device to: based on identifying that first data stored in the first erasing and writing unit is to be moved, identify the second erasing and writing unit as a destination for the first data, and move the first data from the first erasing and writing unit to the second erasing and writing unit, and wherein a life cycle of second data stored in the second erasing and writing unit is the same as a life cycle of the first data stored in the first erasing and writing unit.

According to an aspect of the disclosure, a non-transitory computer readable medium having instructions stored therein, which when executed by at least one processor cause the at least one processor to execute a method of storing data, wherein the method includes: based on identifying that first data stored in a first erasing and writing unit is to be moved, identifying a second erasing and writing unit as a destination for the first data; and moving the first data from the first erasing and writing unit to the second erasing and writing unit, wherein a life cycle of second data stored in the second erasing and writing unit is the same as a life cycle of the first data stored in the first erasing and writing unit.

BRIEF DESCRIPTION OF THE DRAWINGS

The above and other objects and features of certain embodiments of the present disclosure will become more apparent from the following description taken in conjunction with the accompanying drawings, in which.

DETAILED DESCRIPTION

Figure 1:
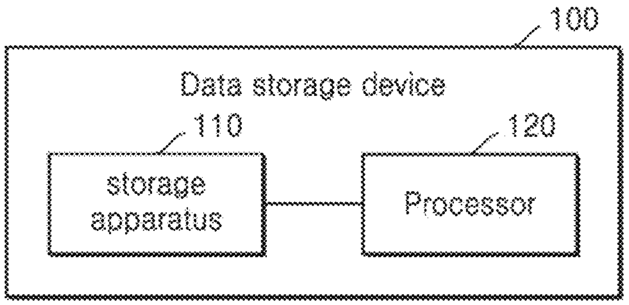
FIG. 1 is a block diagram illustrating a data storage device according to one or more embodiments of the present disclosure.

The following detailed description is provided to assist the reader in gaining an understanding of the methods, apparatuses, and/or systems described herein. However, various changes, modifications, and equivalents of the methods, apparatuses, and/or systems described herein will be apparent after an understanding of the disclosure of the present application. For example, the sequences of operations described herein are merely examples, and are not limited to those set forth herein, but may be changed as will be apparent after an understanding of the disclosure of the present application, with the exception of operations necessarily occurring in a certain order. Also, descriptions of features that are known after an understanding of the disclosure of the present application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of the present application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there may be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

As used herein, terms such as "unit", "module", "member", and "block" may be embodied as hardware or software. As used herein, a plurality of "units", "modules", "members", and "blocks" may be implemented as a single component, or a single "unit", "module", "member", and "block" may include a plurality of components.

As used herein, the expressions "at least one of a, b or c" and "at least one of a, b and c" indicate "only a," "only b," "only c," "both a and b," "both a and c," "both b and c," and "all of a, b, and c."

Hereinafter, examples will be described in detail with reference to the accompanying drawings.

FIG. 1 is a block diagram illustrating a data storage device according to one or more embodiments of the present disclosure.

Referring to FIG. 1, the data storage device 100 may include a storage apparatus 110 and a processor 120. The data storage device 100 may be connected with an external memory and/or communicate with an external device. The data storage device 100 shown in FIG. 1 may include components associated with the current example. Therefore, it will be clear to those skilled in the art that the data storage device 100 may further include other general components in addition to the components shown in FIG. 1.

Here, the data storage device 100 may be any storage apparatus that may perform data storage. By way of example only, the data storage device 100 may include a solid state drive (SSD).

In addition, the data storage device 100 may be implemented in various types of devices such as a personal computer (PC), a server device, a mobile device, an embedded device, and the like. In detail, the data storage device 100 may be included in a smart phone, a tablet device, an augmented reality (AR) device, an Internet of Things (IoT) device, an autonomous vehicle, a robotic device, or a medical device that may store data, but is not limited to thereof.

The storage apparatus 110 may include a plurality of erasing and writing units for storing data. For example, the plurality of erasing and writing units may be used to store various data processed in the data storage device 100. By way of example only, the storage apparatus 110 may be a Zone SSD, a Multi-stream SSD, a Flexible Data Placement (FDP) SSD or the like.

The processor 120 may control the overall function of the data storage device 100. For example, the processor 120 may control the data storage device 100 by executing a program stored in the storage apparatus 110. The processor 120 may be implemented as a central processing unit (CPU), a graphics processing unit (GPU), or an application processor (AP) included in the data storage device 100, but the disclosure is not limited thereto. The processor 120 may be implemented as one or more processors.

Here, the processor 120 may control the operation of storing the data of the data storage device 100. For example, when an instruction is executed in the processor 120, the processor 120 may be configured to: determine a destination to which first data stored in first erasing and writing unit is to be moved as a second erasing and writing unit, in response to the first data being to be moved, wherein a life cycle of second data stored in the second erasing and writing unit is the same as a life cycle of the first data stored in the first erasing and writing unit; and move the first data from the first erasing and writing unit to the second erasing and writing unit.

That is, the data storage device 100 may move or store data taking the life cycle of the data into account such that data stored in the same erasing and writing unit has the same or similar life cycle, thereby reducing the recycling time of the erasing and writing unit, reducing the migration of data for garbage collection, and reducing write amplification.

Hereinafter, examples of the method of storing the data performed by processor 120 will be described with reference to FIGS. 2 to 5.

Figure 2:
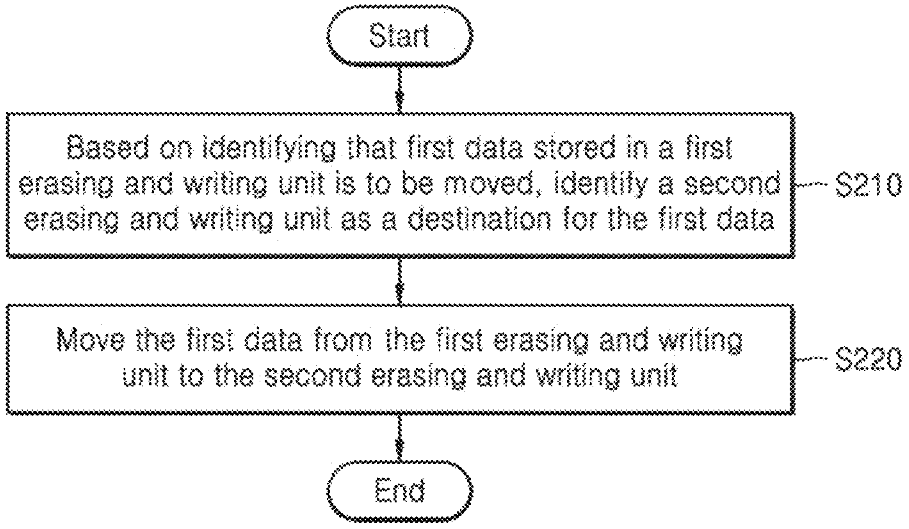
FIG. 2 is a flowchart illustrating a data storage method executed by a processor according to one or more embodiments of the present disclosure.

FIG. 2 is a flowchart illustrating the method of storing the data executed by the processor according to one or more embodiments of the present disclosure.

Referring to FIG. 2, in operation S210, the processor may identify a destination to which first data stored in a first erasing and writing unit is to be moved as a second erasing and writing unit based on identifying that the first data is to be moved. In an embodiment, a life cycle of the second data stored in the second erasing and writing unit is the same as a life cycle of the first data stored in the first erasing and writing unit.

The life cycle of the second data being the same as the life cycle of the first data may indicate that the life cycle of the second data and the life cycle of the first data have the same or similar ranges or values of the life cycles.

The data (e.g., the first data and the second data) may be any type of data. In a non-limiting example, the data may include a log-structured merged tree (LSM-Tree) file. The LSM-Tree is a level-based data structure and is used in many key-value (KV) stores including RocksDB, LevelDB, and Cassandra. The LSM-Tree uses an append-only write structure to eliminate random write operations, which makes writes super-efficient.

In an example embodiment, the first data may include the log-structured merge tree file, and a life cycle of the log-structured merge tree file is determined based on one or more of a heat classification, a level-based feature, and a file type of the log-structured merge tree file. The life cycle of the first data may be determined via any method (e.g., a simulation method, a modelling method, etc.) based on one or more of the heat classification, the level-based features, and the file type of the log-structured merged tree file.

In an embodiment, the file type of the log-structured merged tree file may include a sorted string table (SST) file, a write ahead log (WAL) file, and a remaining file. In one or more embodiments, the sorted string table file, the write ahead log file, and the remaining file may be stored in different erasing and writing units. Typically, the life cycles of the sorted string table file, the life cycles of the write ahead log file, and the life cycles of the remaining file have large differences. Therefore, by storing the sorted string table file, the write ahead log file, and the remaining file in different erasing and writing units, it may be ensured that the same file type is stored within the each respective erasing and writing unit, and it is easier to ensure that the data within the same erasing and writing unit has the same life cycle, so as to shorten the reclaim cycle of the erasing and writing unit, and thus to reduce the re-location of garbage collection.

In addition, the life cycle of the sorted string table file is determined as one of multiple life cycles based on at least one of the heat classification and the level-based feature of the log-structured merged tree file. For example, the LSM-Tree provides the heat classification and the level-based features for SST files. At least one of the heat classification and class-based features may be used to determine the life cycle of the SST file. In one example, the life cycle of the SST file may be divided, based on at least one of the heat classification and level-based features of the log-structured merged tree file, into Hint values: WLTH_SHORT, WLTH_MEDIUM, and WLTH_LONG. WLTH_SHORT may indicate a relatively short life cycle, WLTH_MEDIUM may indicate a medium life cycle, and WLTH_LONG may indicate a relatively long life cycle. That is, data (e.g., the life cycle of the data) may be distinguished by the file type (e.g., suffix) and the hint value. However, the above example is only illustrative, and the life cycle of the SST file may be divided into two or four or more hint values based on at least one of the heat classification and the level-based features of the log-structured merged tree file.

In addition, the erasing and writing unit (e.g., the first erasing and writing unit and the second erasing and writing unit) may be any type of erasing and writing unit. In a non-limiting example, the first erasing and writing unit and the second erasing and writing unit may correspond to a Reclaim Unit (RU) in a Flexible Data Placement (FDP) solid state drive (SSD), where a write operation of the Reclaim Unit is performed by a Reclaim Unit Handle (RUH) that corresponds to the Reclaim Unit, and the Reclaim Unit Handle is set to a persistent isolation type. The FDP SSD will be described more specifically later in connection with FIG. 5.

In operation S220, the processor may move the first data from the first erasing and writing unit to the second erasing and writing unit.

That is, in response to identifying that the first data stored in the first erasing and writing unit is to be moved, the processor may move the first data from the first erasing and writing unit to the second erasing and writing unit, where the second erasing and writing unit stores data having the same life cycle as the life cycle of the first data. Accordingly, it may be ensured that the data having a given life cycle may only be mixed with the data having the same life cycle no matter how it is moved, thereby ensuring that the data within a given erasing and writing unit has the same life cycle, and thereby reducing the recycling time of the erasing and writing unit, reducing the migration of the data for garbage collection, and reducing the write amplification.

Figure 3:
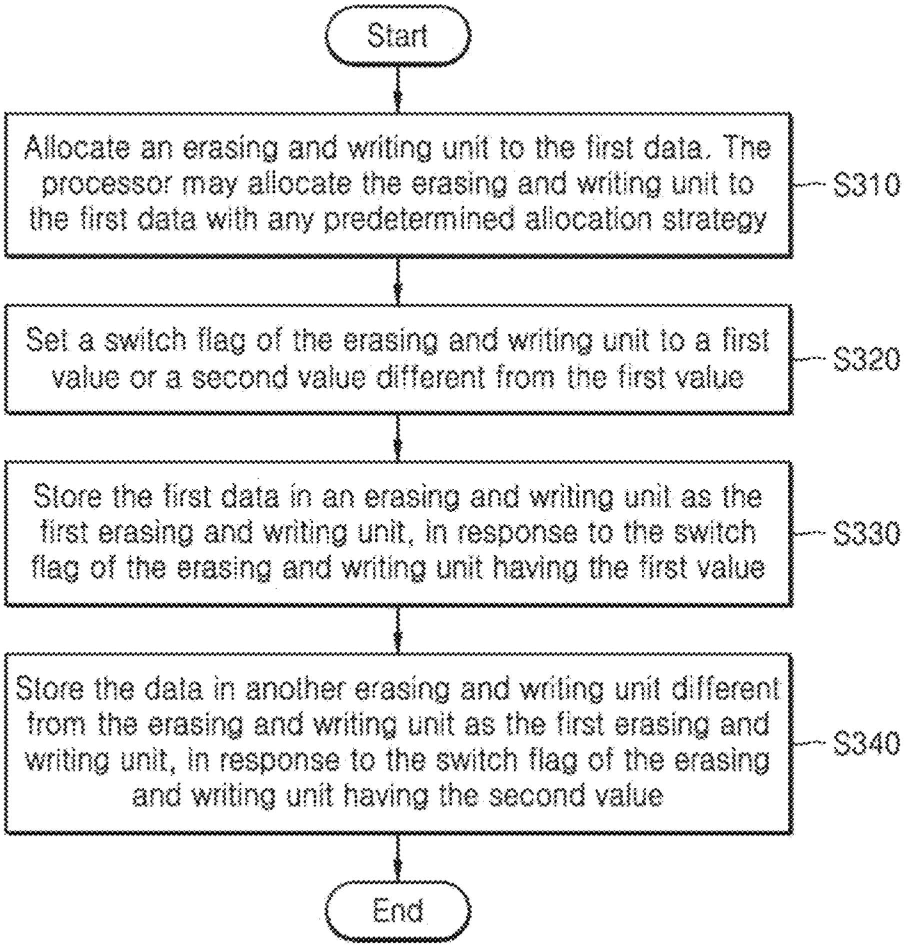
FIG. 3 illustrates a flowchart of a method of storing first data in an erasing and writing unit according to one or more embodiments of the present disclosure.

FIG. 3 illustrates a flowchart of a method of storing first data in an erasing and writing unit according to one or more embodiments of the present disclosure.

Referring to FIG. 3, in operation S310, the processor may allocate an initial erasing and writing unit to the first data. The processor may allocate the initial erasing and writing unit to the first data with any predetermined allocation strategy.

In operation S320, the processor may set a switch flag of the initial erasing and writing unit to a first value or a second value different from the first value. The first value may indicate that a storage space of the initial erasing and writing unit is sufficient to hold the first data, and the second value may indicate that the storage space of the initial erasing and writing unit is insufficient to hold the first data.

That is, the processor may determine whether the storage space of the initial erasing and writing unit allocated to the first data is sufficient to hold the first data. When the storage space of the initial erasing and writing unit is sufficient to hold the first data, the processor may set the switch flag of the initial erasing and writing unit to the first value. When the storage space of the initial erasing and writing unit is insufficient to hold the first data, the processor may set the switch flag of the initial erasing and writing unit to the second value. The storage space of the initial erasing and writing unit may indicate an actual remaining storage space of the initial erasing and writing unit.

In operation S330, in response to the switch flag of the initial erasing and writing unit having the first value, the first data is stored in the initial erasing and writing unit as the first erasing and writing unit.

In operation S340, in response to the switch flag of the initial erasing and writing unit having the second value, the first data is stored in an alternative erasing and writing unit, which is different from the initial erasing and writing unit, as the first erasing and writing unit. The storage space of the alternative erasing and writing unit is sufficient to hold the first data.

In an example embodiment, the processor may switch a state of the initial erasing and writing unit with the switch flag having the second value from an open state to a close state, and switch a state of the alternative erasing and writing unit from an empty state or the close state to the open state. Afterwards, the processor may store the first data in the alternative erasing and writing unit.

In addition, in one or more embodiments, the initial erasing and writing unit may be configured to store data having a life cycle that is the same as the life cycle of the first data, and the alternative erasing and writing unit may be configured to store data having a life cycle that is the same as the life cycle of the first data. Since the initial erasing and writing unit and/or the alternative erasing and writing unit are configured to store data having the same life cycle as the life cycle of the first data, it is ensured that data within a given erasing and writing unit has the same life cycle.

According to one or more embodiments, when the storage space of the initial erasing and writing unit allocated to the first data is insufficient to hold the first data, another erasing and writing unit (e.g., the alternative erasing and writing unit) with storage space sufficient to hold the first data is reallocated to the first data such that the first data is not stored across different erasing and writing units, thereby solving the problem of prolonged reclaim cycles of data stored across different erasing and writing units.

Figure 4:
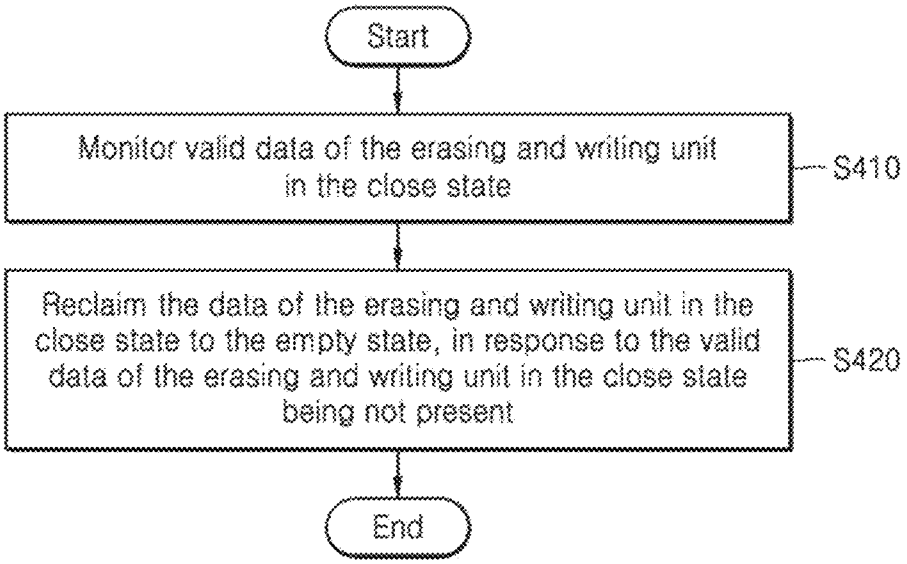
FIG. 4 illustrates a flowchart of a data storage method executed by a processor according to one or more embodiments of the present disclosure.

FIG. 4 illustrates a flowchart of a method of storing data performed by a processor according to one or more embodiments of the present disclosure.

In operation S410, the processor may monitor valid data of the erasing and writing unit in the close state.

The processor may monitor the valid data of an erasing and writing unit in the close state in various ways. In a non-limiting example, the processor may add the erasing and writing unit in the close state to a monitoring list to maintain a list of the erasing and writing units in the close state and maintain a bitmap of valid data for the erasing and writing units.

In operation S420, the processor may reclaim (or recycle) the data in the erasing and writing unit in the close state and switch the state of the erasing and writing unit in the close state to the empty state in response to the valid data of the erasing and writing unit in the close state being removed.

Typically, even if there is no more valid data in an erasing and writing unit in the close state, the device does not actively reclaim it because there is still space remaining in the erasing and writing unit in the close state. In contrast, according to one or more embodiments of the present disclosure, by monitoring the valid data in the erasing and writing unit in the close state, the processor may actively reclaim the erasing and writing unit without valid data in the close state, and thus better ensure space utilization.

In addition, in one or more embodiments, the processor may further set the erasing and writing unit in the close state as a priority for reclamation to further ensure space utilization. For example, the processor may set the garbage collection policy to prioritize the erasing and writing unit in the close state for recycling.

Figure 5:
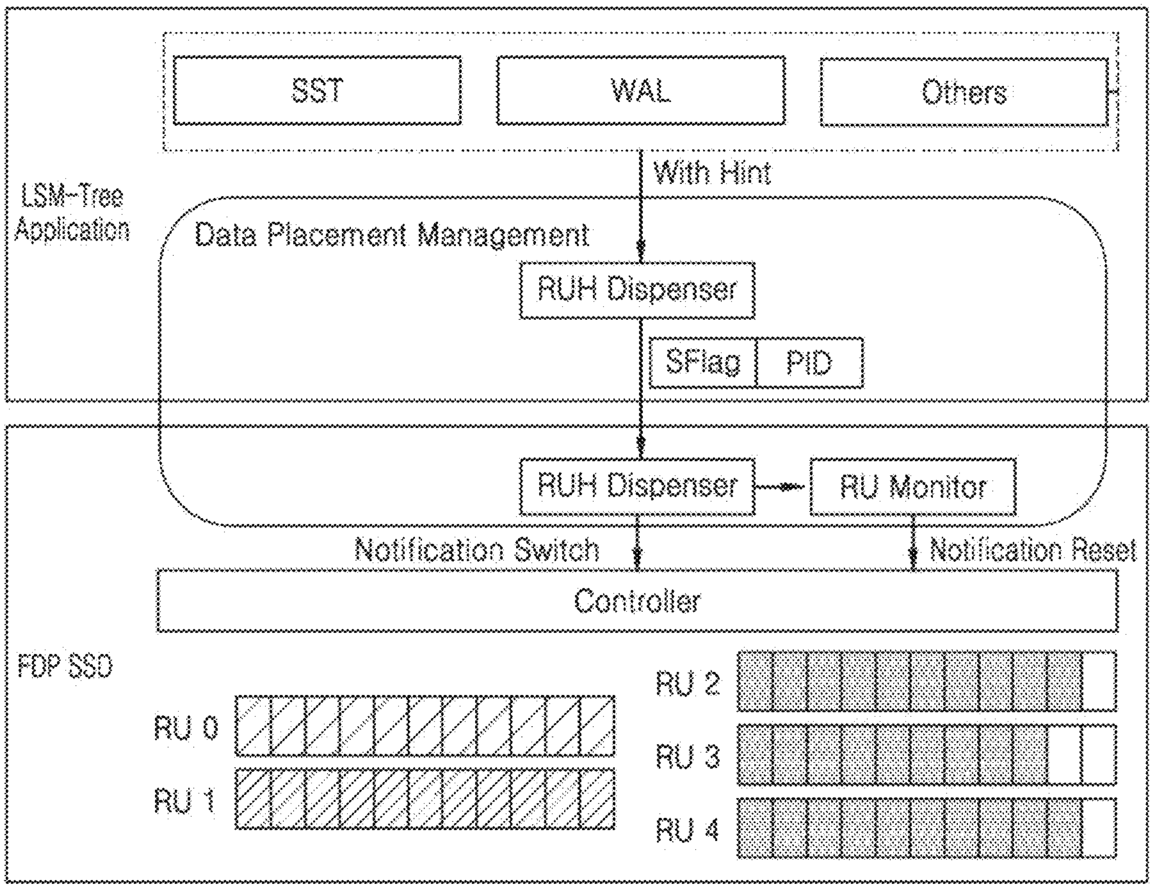
FIG. 5 illustrates a schematic block diagram of a data storage system according to one or more embodiments of the present disclosure.

FIG. 5 illustrates a schematic block diagram of a system of storing data according to one or more embodiments of the present disclosure.

Referring to FIG. 5, the system of storing the data may include a data storage device (e.g., an FDP SSD). The FDP SSD is a SSD product for solving the write amplification problem. The erase and write unit becomes a reclaim unit. The user may only perform write operations through the reclaim unit handle. Its write attributes include: ① the host determines the RUH where the data will go (Selection of Placement ID (PID)); and ② the controller places the data on the corresponding RU according to the RUH mapped by the PID selected by the user. In addition, there are two types of isolation for RUs, initial isolation and permanent isolation. For initial isolation, user data (e.g., GC data) is moved to other RUs that may contain other data of the same type of the RUH. While for permanent isolation, the user data (e.g., the GC data) is moved to different RUs that contain other data of the same RUH.

The RUH dispenser may filter files (e.g., file data for the LSM-Tree application) by type and/or life cycle. For example, the RUH dispenser may classify files by type into Sorted String Table (SST) files, write ahead log (WAL) files, and remaining files. As another example, the RUH dispenser may classify files by life cycle. In an example, the RUH dispenser may classify the life cycle of a file or data as having different hint values: WLTH_SHORT, WLTH_MEDIUM, and WLTH_LONG. WLTH_SHORT may indicate a relatively short life cycle, WLTH_MEDIUM may indicate a medium life cycle, and WLTH_LONG may indicate a relatively long life cycle.

Additionally, the RUH dispenser may allocate the reclaim unit used to store the files of the LSM-Tree application by allocating a placement ID (PID) of the reclaim unit used to store the files of the LSM-Tree application.

In addition, the RUH dispenser may allocate a switch flag (SFlag) to the reclaim unit for storing the files of the LSM-Tree application. The RUH dispenser will be described more specifically later in connection with FIGS. 6 and 7.

The RU switcher may determine whether to trigger a RU switch and a RU state transition (e.g., a RU state transition from on to off) by the SFlag of the allocated reclaim unit. The RU switcher may send a notification switch to the controller based on the SFlag of the allocated reclaim unit. The controller may control the write operation based on the notification switch. The RU switcher and the controller will be described more specifically later in connection with FIGS. 8 and 9.

The RU monitor may monitor the RUs in the close state in order to reclaim data in the RUs in the close state in a timely manner. The RU monitor may send a notification reset to the controller based on the results of the monitoring. The controller may control a reset operation of the RU based on the notification reset. The RU monitor and the controller will be described more specifically later in connection with FIGS. 10 and 11.

Figure 6:
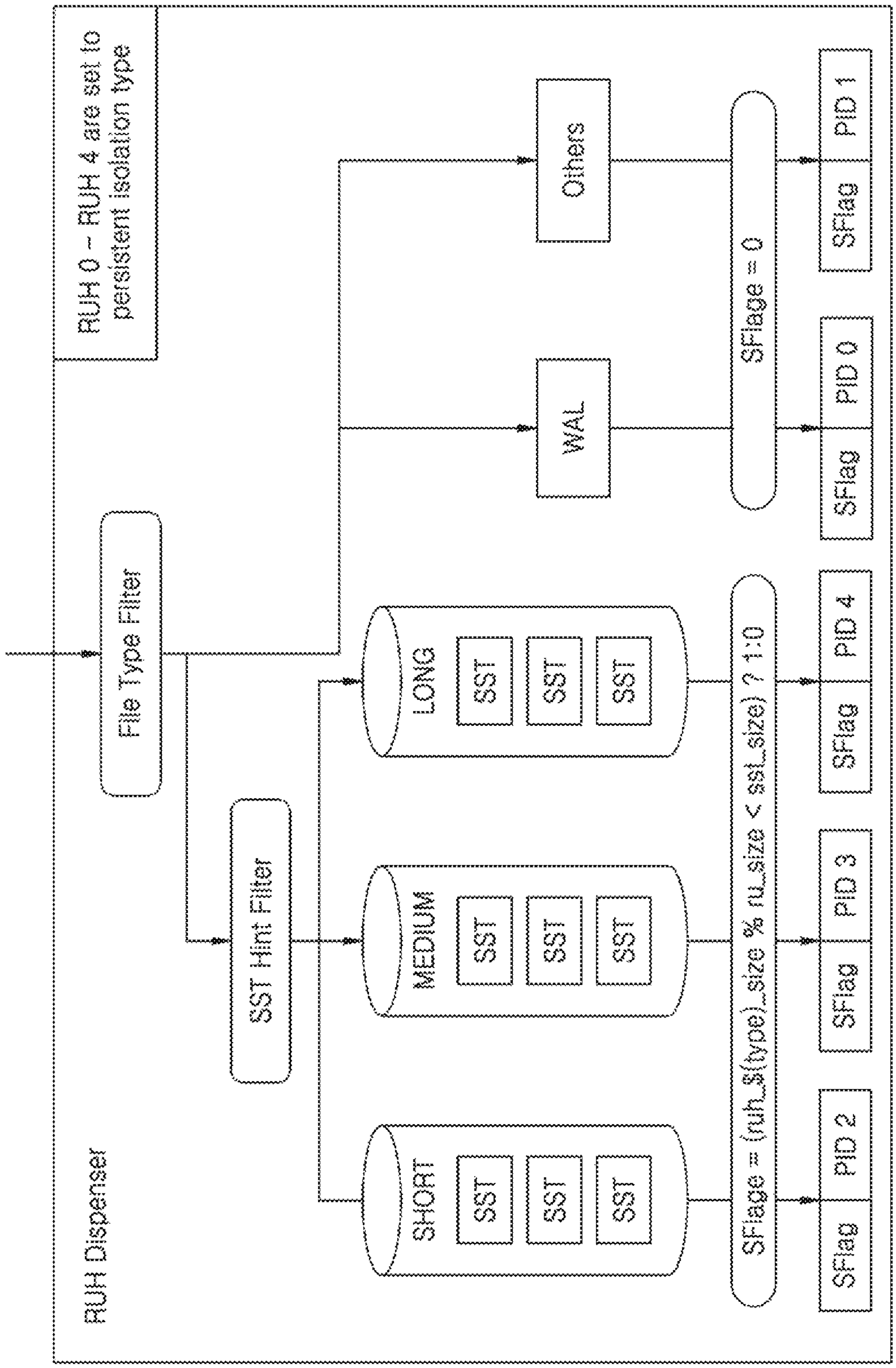
FIG. 6 illustrates a schematic block diagram of a Reclaim Unit Handle (RUH) dispenser according to one or more embodiments of the present disclosure.
Figure 7:
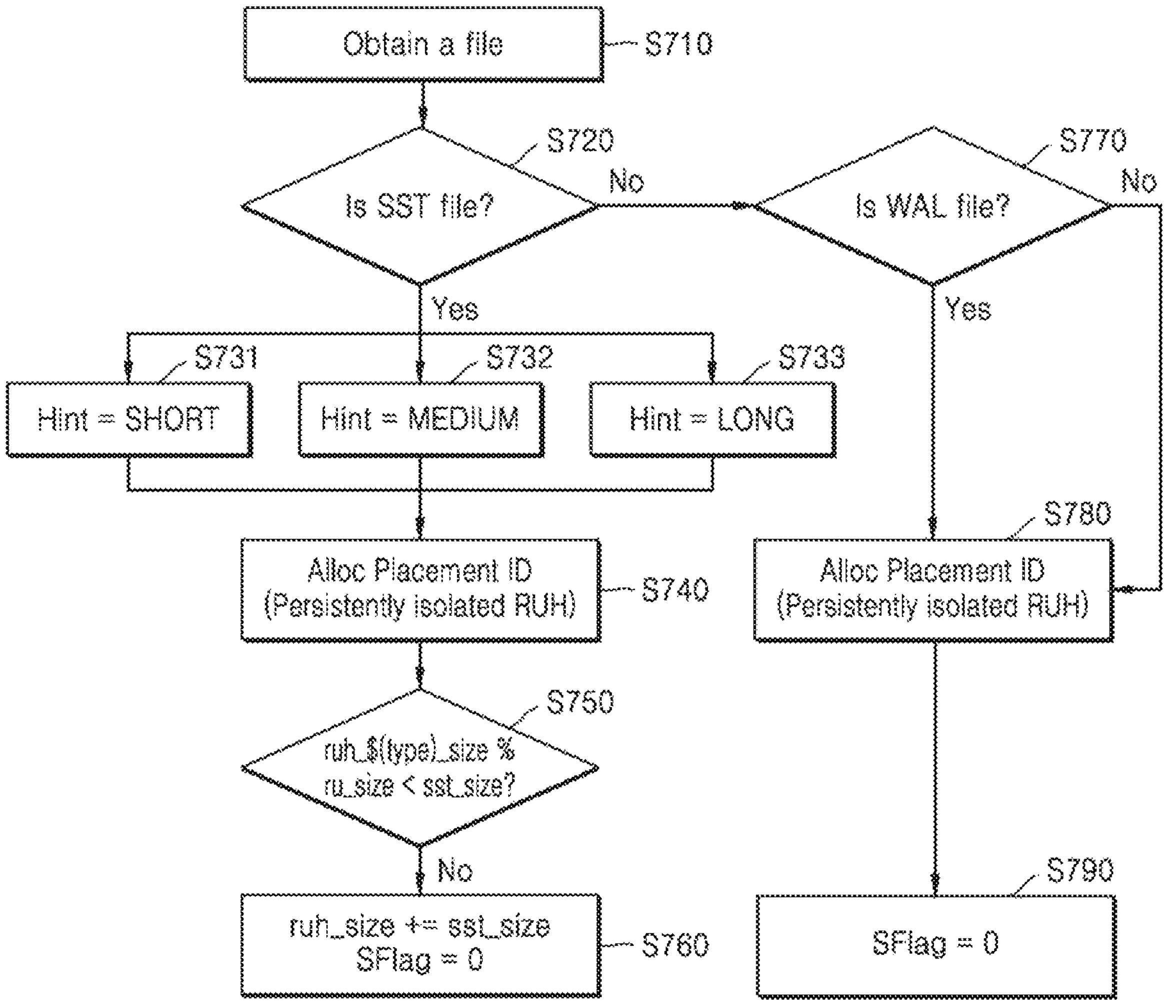
FIG. 7 illustrates a flowchart of an operation of a RUH dispenser according to one or more embodiments of the present disclosure.

FIG. 6 illustrates a schematic block diagram of a RUH dispenser according to one or more embodiments of the present disclosure. FIG. 7 illustrates a flowchart of operations of the RUH dispenser according to one or more embodiments of the present disclosure.

Referring to FIG. 6, the RUH dispenser may include a file type filter and an SST hint filter.

Referring to FIG. 7, the RUH dispenser may obtain a file (e.g., an LST-Tree file) in operation S710.

The RUH dispenser (e.g., the file type filter) may determine a type of the LST-Tree file. For example, the file type filter may classify the file by type as a Sorted String Table (SST) file, a write ahead log (WAL) file, and the remaining file.

The RUH dispenser may determine whether the LST-Tree file is the SST file in operation S720.

In response to determining in operation S720 that the LST-Tree file is the SST file, the RUH dispenser (e.g., the SST hint filter) may determine a life cycle of the SST file. For example, in operation S731, the RUH dispenser may classify the life cycle of the SST file as having a hint value of "short", where "short" may indicate a relatively short life cycle. In operation S732, the RUH dispenser may classify the life cycle of the SST file as having a hint value of "medium", wherein "medium" may indicate a medium life cycle. In operation S733, the RUH dispenser may classify the life cycle of the SST file as having a hint value of "long", wherein "long" may indicate a relatively long life cycle.

In operation S740, the RUH dispenser may allocate a placement ID (PID) and set the RUH to a persistent isolation type. For example, the RUH dispenser may set RUH0-RUH4 to the persistent isolation type. By setting the RUHs to the persistent isolation type, it may be ensured that file data of the current life cycle may only be mixed with file data that has the same hint value no matter how it is moved. Therefore, it may be ensured that the data within one RU has the same hint value, thus shortening the RU reclaim cycle and reducing GC relocation.

The RUH dispenser may record the size of the data written by each RUH. In operation S750, the RUH dispenser may determine whether the used RU space is sufficient to hold the current SST file. For example, the RUH dispenser may determine whether the used RU space is sufficient to hold the current SST file by calculating the remaining space of the RU to which the current RUH points through a formula "SFlag=(ruh_$(type)_size%ru_size<sst_size?1:0)", wherein ru_size denotes the size of the RU, ruh_$(type)_size denotes the used size of the RU, ruh_$(type)_size%ru_size denotes the unused size of the RU, and sst_size denotes the size of the SST file. This can ensure that the same SST file is not stored across RUs and solve the problem of prolonged RU reclaim cycle for cross-RU file storage.

When the unused size of the RU is less than the size of the SST file, the SFlag may be set to 0 at operation S760. When the unused size of the RU is greater than or equal to the size of the SST file, the SFlag may be set to 1.

The RUH dispenser may bind the PID (e.g., PID0 to PID4) to the life cycle of the file (e.g., a hint value). By binding, it is possible to write files which use different hint values using different RUHs. In addition, the value of the SFlag is calculated by the formula and sent to the device side at the same time as the PID.

In response to determining in operation S710 that the LST-Tree file is not the SST file, the RUH dispenser may determine in operation S770 whether the LST-Tree file is the WAL file.

According to the determination result in operation S770, the RUH dispenser may allocate the placement ID (PID) in operation S780 and set the RUH to the persistent isolation type. In operation S790, the RUH dispenser may set the SFlag to 0.

Figure 8:
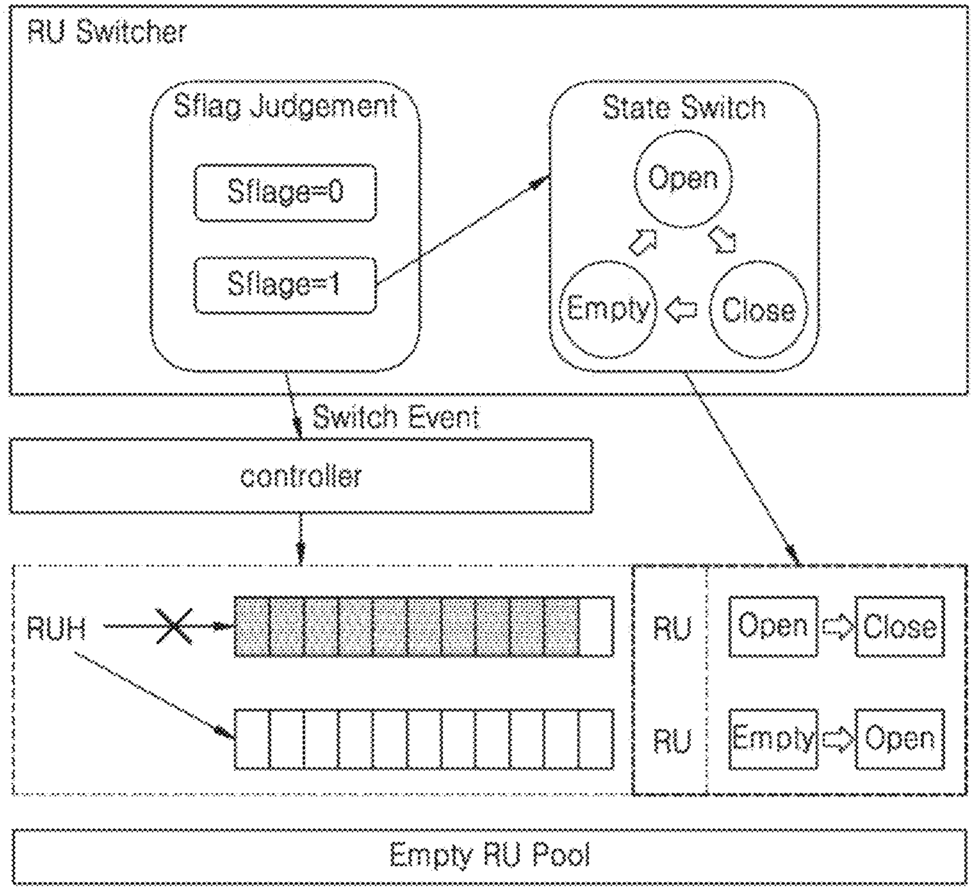
FIG. 8 illustrates a schematic diagram of a RUH dispenser and a controller according to one or more embodiments of the present disclosure.
Figure 9:
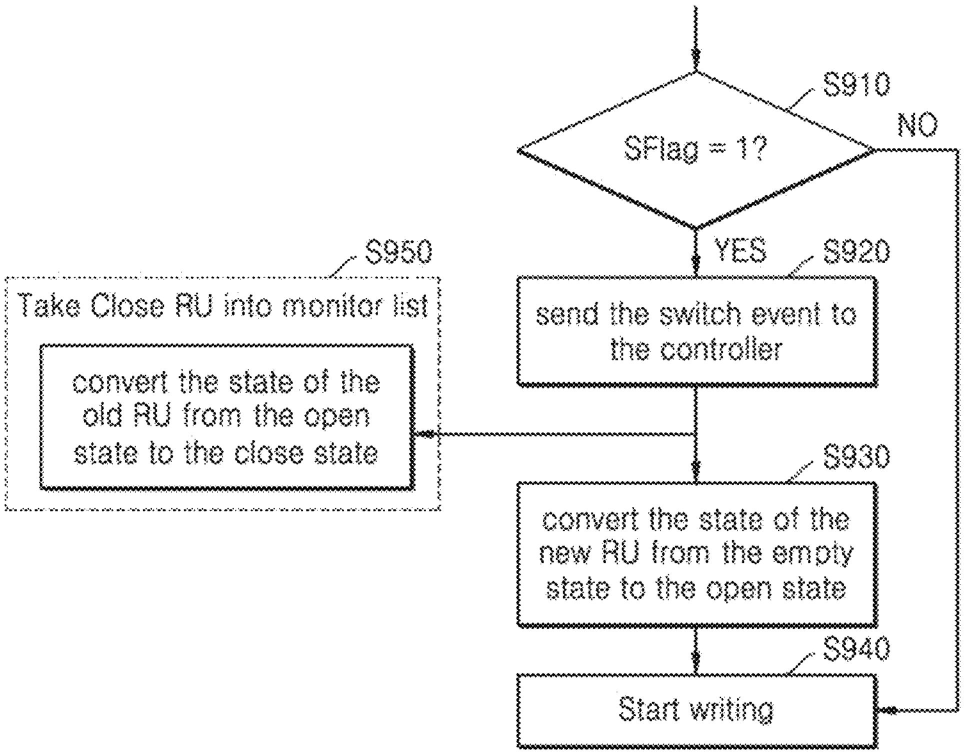
FIG. 9 illustrates a flowchart of an operation of a RU switcher and a controller according to one or more embodiments of the present disclosure.

FIG. 8 illustrates a schematic diagram of a RUH switcher and a controller according to one or more embodiments of the present disclosure. FIG. 9 illustrates a flowchart of an operation of the RU switcher and the controller according to one or more embodiments of the present disclosure.

The RU switcher may be used as an additional component of the FTL on the device side. Referring to FIG. 8, the RU switcher may include an event triggering function for RU switch (e.g., SFlag judgement) and a state switching.

Referring to FIG. 9, in operation S910, the RU switcher may determine whether the value of the SFlag is 1. In other words, the value of the SFlag may be set as an event trigger function or a trigger condition for the RU switch. The state of the RU switch may comprise one or more of an open state, an empty state, and a close state.

In operation S920, the RU switcher may send the switch event to the controller when the value of the Sflag is 1. The controller of the FDP SSD may modify the RUH to reference a different RU. For example, the controller may be implemented by a processor. The controller responds to the switch event, and switches the RUH corresponding to the current PID to point to an RU in an empty state. The RU in the empty state may be from a pool of empty RUs.

In operation S930, the RU switcher may convert the state of the new RU from the empty state to the open state.

In operation S940, the controller may begin writing. For example, when the Sflag is 0, the RUH is found based on the allocated PID and the controller writes data directly to the RU.

Further, in operation S950, the RU switcher may convert the state of the old RU from the open state to the close state, and then add the RU in the close state into the monitoring list of the RU monitor.

Figure 10:
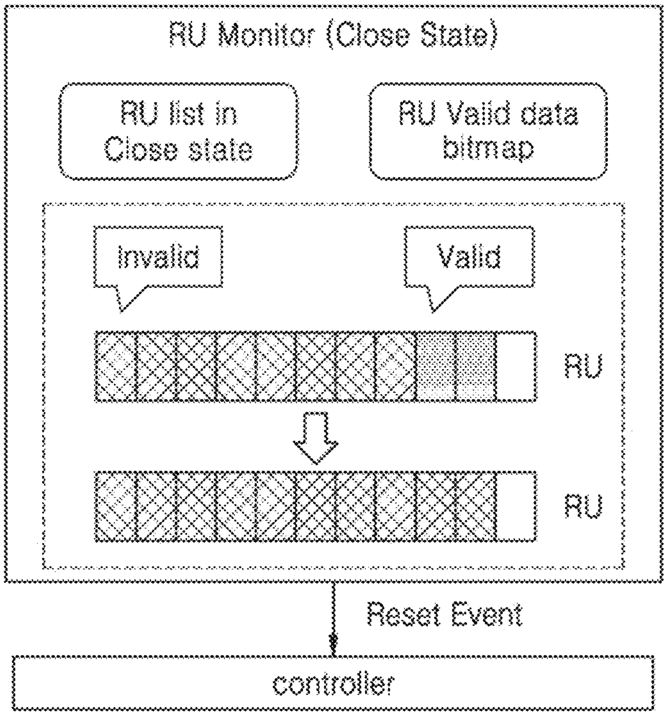
FIG. 10 illustrates a schematic diagram of a RU monitor and a controller according to one or more embodiments of the present disclosure.
Figure 11:
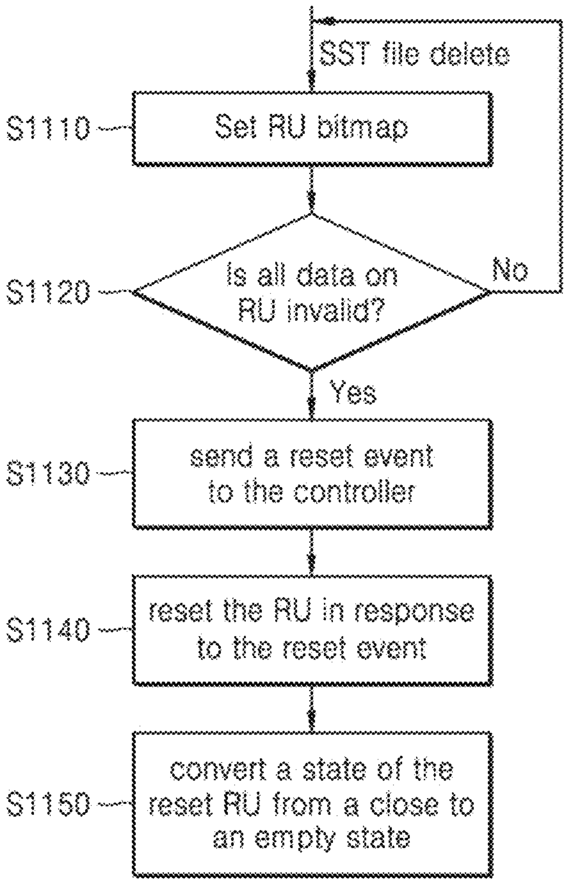
FIG. 11 illustrates a flowchart of an operation of a RU monitor and a controller according to one or more embodiments of the present disclosure.

FIG. 10 illustrates a schematic diagram of the RU monitor and the controller according to one or more embodiments of the present disclosure. FIG. 11 illustrates a flowchart of an operation of the RU monitor and the controller according to one or more embodiments of the present disclosure.

Even if there is no more valid data in the RU in the close state, the device side does not actively reclaim the RU in the close state, because the RU in the close state may still have space remaining. To ensure utilization space, the RU monitor according to one or more embodiments actively reclaims RUs without valid data in the close state. At the same time, the garbage collection policy treats RUs in the close state as a priority for recycling.

In an example, the RU monitor may include all RUs in the close state in the monitoring. For example, the RU monitor may maintain a list of RUs in the close state and maintain a map of RU valid data bits. In addition, the RU monitor may actively send a reset event. For example, when there is no valid data in the close state, the controller is triggered to reset the RU. After the reclaim, the RU state becomes the empty state and is no longer monitored.

Referring to FIGS. 10 and 11, in operation S1110, the RU monitor may set the RU valid data bitmap. In an example, the RU bitmap may be set after deleting the SST file in the RU.

In operation S1120, the RU monitor may determine whether all data on the RU is invalid. For example, the RU monitor may determine whether all data on the RU is invalid based on the RU valid data bitmap.

When it is determined in operation S1120 that not all data on the RU is invalid, it may return to operation S1110.

When it is determined in operation S1120 that all data on the RU is invalid, the RU monitor may send a reset event to the controller in operation S1130.

In operation S1140, the controller may reset the RU in response to the reset event.

In operation S1150, the RU switcher may convert a state of the reset RU from a close state to an empty state.

Figure 12:
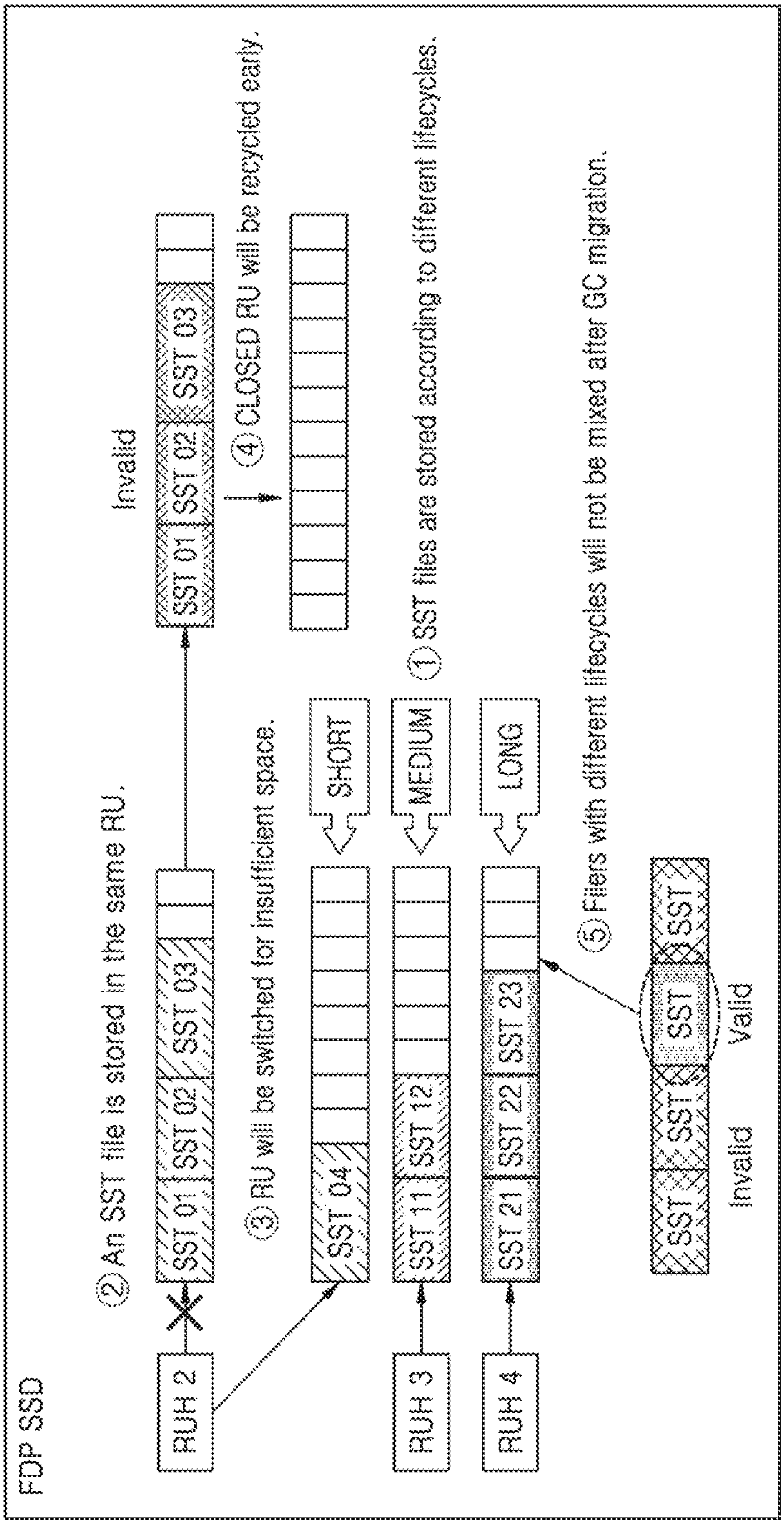
FIG. 12 illustrates a schematic diagram of a data storage method according to one or more embodiments of the present disclosure.

FIG. 12 illustrates a schematic diagram of a method of storing data according to one or more embodiments of the present disclosure.

Referring to FIG. 12, in operation ①, SST files are stored based on different life cycles of the SST files. For example, an SST file SST04 having a short life cycle may be stored in a first RU, an SST file SST11 and an SST file SST12 having a medium life cycle may be stored in a second RU, and an SST file SST21, an SST file SST22, and an SST file SST23 having a long life cycle may be stored in a third RU.

In operation ②, the SST file is stored in the same RU. In other words, a single SST file is not stored across RUs. As a result, LSM-Tree files having different life cycles are not mixed on the RUs, and the same file is not stored on multiple RUs, thus reducing the reclaim time of the reclaim unit.

In operation ③, the RUs will be switched with respect to insufficient space. For example, the SST file SST21, the SST file SST22, and the SST file SST23 may have been stored in the fourth RU pointed to by a RUH2. When the fourth RU is allocated for storing the SST file SST04, RUH2 is modified to refer to the first RU for storing the SST file SST04 since the remaining storage space of the fourth RU pointed to by the RUH2 is insufficient to store the SST file SST04.

In operation 4, the RU that is close will be reclaimed early. The fourth RU may be switched from the open state to the close state since the RUH2 referencing the fourth RU is modified to reference the first RU in operation ③. The RUs in the close state will be reclaimed early, and as a result, the reclaim time of the RUs is reduced, the GC data movement is reduced, and the write amplification is reduced. For example, early reclamation of RU resources reduces the probability of triggering GC. In addition, RUs in the close state improve the GC reclaim process.

In operation ⑤, files with different life cycles are not mixed after GC migration. For example, an SST file SST having a long life cycle and being valid may be mixed with an SST file SST21, an SST file SST22, and an SST file SST23 having a long life cycle.

According to the method of storing data of one or more embodiments of the present disclosure, it may be ensured that the data of the current life cycle may only be mixed with the data of the same life cycle no matter how it is moved, thereby ensuring that the data within the same erasing and writing unit has the same life cycle, and thereby reducing the recycling time of the erasing and writing unit, reducing the migration of the data for garbage collection, and reducing the write amplification.

According to the method of storing data of one or more embodiments of the present disclosure, by storing the sorted string table file, the write ahead log file, and the remaining file in different erasing and writing units, it may be ensured that the file type within the same erasing and writing unit is single, and it is easier to realize that the data within the same erasing and writing unit has the same life cycle, so as to shorten the reclaim cycle of the erasing and writing unit, and to reduce the re-location of garbage collection.

According to the method of storing data of one or more embodiments of the present disclosure, when the storage space of the erasing and writing unit allocated to the first data is insufficient to hold the first data, another erasing and writing unit with storage space sufficient to hold the first data is reallocated to the first data such that the first data is not stored across the erasing and writing unit, thereby solving the problem of prolonged reclaim cycles of data stored across the erasing and writing unit.

According to the method of storing data of one or more embodiments of the present disclosure, by monitoring the valid data in the erasing and writing unit in the close state, the erasing and writing unit without valid data in the close state may be actively reclaimed, thus being able to better ensure space utilization.

According to the method of storing data of one or more embodiments of the present disclosure, the erasing and writing unit in the close state may be set as a priority for reclaim to further ensure space utilization.

According to the method of storing data of one or more embodiments of the present disclosure, by setting the RUHs to a persistent isolation type, it may be ensured that file data of the current life cycle may only be mixed with file data that has the same hint value no matter how it is moved. Therefore, it may be ensured that the data within one RU has the same hint value, thus shortening the RU reclaim cycle and reducing GC relocation.

According to one or more embodiments of the present disclosure, the above-described processor may be implemented using a combination of hardware, hardware and software, or a non-transitory storage medium storing executable software for performing its functions.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiment may be exemplified as one computer processing device; however, those skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer-readable recording media, including tangible or non-transitory computer-readable storage media as discussed herein.

For example, according to one or more embodiments of the present disclosure, provided is a computer-readable storage medium storing a computer program, which, when executed by a processor, implements a method of storing data at least including: determine a destination to which first data stored in a first erasing and writing unit is to be moved as a second erasing and writing unit, in response to that first data is to be moved. A life cycle of the second data stored in the second erasing and writing unit is the same as a life cycle of the first data stored in the first erasing and writing unit; and moving the first data from the first erasing and writing unit to the second erasing and writing unit. Further, other methods of the present disclosure may similarly be implemented by a computer-readable storage medium storing a computer program.

Storage media may also include one or more storage devices at units and/or devices according to one or more example embodiment. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiment described herein. The computer programs, program code, instructions, or some combination thereof, may also be loaded from a separate computer-readable storage medium into the one or more storage devices and/or one or more computer processing devices using a drive mechanism. Such a separate computer-readable storage medium may include a Universal Serial Bus (USB) flash drive, a memory stick, a Blu-ray/DVD/CD-ROM drive, a memory card, and/or other like computer-readable storage media. The computer programs, program code, instructions, or some combination thereof, may be loaded into the one or more storage devices and/or the one or more computer processing devices from a remote data storage device via a network interface, rather than via a computer-readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiment, or they may be known devices that are altered and/or modified for the purposes of example embodiment.

The foregoing is illustrative of one or more example embodiments and is not to be construed as limiting the overall disclosure thereto. Although a few example embodiment have been described, those skilled in the art will readily appreciate that many modifications are possible in the example embodiment without materially departing from the novel teachings and advantages of example embodiment of the present disclosure. Accordingly, all such modifications are intended to be included within the scope of example embodiment of the present disclosure as defined in the claims. Therefore, it is to be understood that the foregoing is illustrative of various example embodiment and is not to be construed as limited to the specific example embodiment disclose, and that modifications to the disclose example embodiment, as well as other example embodiment, are intended to be included within the scope of the appended claims.

What is claimed is:

1. A method of storing data, the method comprising:

based on identifying that first data stored in a first erasing and writing unit is to be moved, identifying a second erasing and writing unit as a destination for the first data; and moving the first data from the first erasing and writing unit to the second erasing and writing unit, wherein a life cycle of second data stored in the second erasing and writing unit before the first data is moved to the second erasing and writing unit is the same as a life cycle of the first data stored in the first erasing and writing unit.

2. The method of claim 1, further comprising:

storing the first data in the first erasing and writing unit, wherein the storing the first data in the first erasing and writing unit comprises:

allocating an initial erasing and writing unit to the first data;

setting a switch flag of the initial erasing and writing unit to a first value or to a second value different from the first value, wherein the first value indicates that a storage space of the initial erasing and writing unit is sufficient to hold the first data, and the second value indicates that the storage space of the initial erasing and writing unit is insufficient to hold the first data;

based on the switch flag having the first value, storing the first data in the initial erasing and writing unit and identifying the initial erasing and writing unit as the first erasing and writing unit; and based on the switch flag having the second value, storing the first data in an alternative erasing and writing unit and identifying the alternative erasing and writing unit as the first erasing and writing unit, wherein the alternative erasing and writing unit is different from the initial erasing and writing unit and the alternative erasing and writing unit comprises a storage space sufficient to hold the first data.

3. The method of claim 2, wherein the storing the first data in the alternative erasing and writing unit further comprises:

switching a state of the initial erasing and writing unit from an open state to a close state;

switching a state of the alternative erasing and writing unit from an empty state or the close state to the open state; and storing the first data in the alternative erasing and writing unit.

4. The method of claim 3, further comprising:

monitoring valid data of an erasing and writing unit in the close state; and based on identifying that there is no valid data in the erasing and writing unit in the close state, reclaiming data in the erasing and writing unit in the close state and switching the state of the erasing and writing unit in the close state to the empty state.

5. The method of claim 3, further comprising:

prioritizing the erasing and writing unit in the close state as an object for reclamation.

6. The method of claim 2, wherein both the initial erasing and writing unit and the alternative erasing and writing unit store data having a life cycle that is the same as the life cycle of the first data.

7. The method of claim 1, wherein the first data comprises a log-structured merged tree file, and wherein a life cycle of the log-structured merged tree file is determined based on one or more of a heat classification, a level-based feature, and a file type of the log-structured merged tree file.

8. The method of claim 7, wherein the file type of the log-structured merged tree file comprises a sorted string table file, a write ahead log file, and a remaining file, and the sorted string table file, the write ahead log file, and the remaining file are stored in different erasing and writing units, and wherein a life cycle of the sorted string table file is determined to be one of a plurality of life cycles based on at least one of the heat classification and the level-based feature of the log-structured merged tree file.

9. The method of claim 1, wherein the first erasing and writing unit and the second erasing and writing unit correspond to a reclaim unit in a flexible data placement solid state drive, wherein the method further comprises performing write operations of the reclaim unit using a reclaim unit handle corresponding to the reclaim unit, and wherein the reclaim unit handle is set to a persistent isolation type.

10. A data storage device comprising:

a storage apparatus comprising a first erasing and writing unit and a second erasing and writing unit, wherein the first and the second erasing and writing units are configured to store data;

at least one processor; and at least one memory storing one or more instructions, wherein the one or more instructions, when executed by the at least one processor, are configured to cause the data storage device to:

based on identifying that first data stored in the first erasing and writing unit is to be moved, identify the second erasing and writing unit as a destination for the first data, and move the first data from the first erasing and writing unit to the second erasing and writing unit, and wherein a life cycle of second data stored in the second erasing and writing unit before the first data is moved to the second erasing and writing unit is the same as a life cycle of the first data stored in the first erasing and writing unit.

11. The data storage device of claim 10, wherein the one or more instructions, when executed by the at least one processor, are further configured to cause the data storage device to:

allocate an initial erasing and writing unit to the first data, set a switch flag of the initial erasing and writing unit to a first value or to a second value different from the first value, wherein the first value indicates that a storage space of the initial erasing and writing unit is sufficient to hold the first data, and the second value indicates that the storage space of the initial erasing and writing unit is insufficient to hold the first data, based on the switch flag having the first value, store the first data in the initial erasing and writing unit and identify the initial erasing and writing unit as the first erasing and writing unit, and based on the switch flag having the second value, store the first data in an alternative erasing and writing unit and identify the alternative erasing and writing unit as the first erasing and writing unit, wherein the alternative erasing and writing unit is different from the initial erasing and writing unit and the alternative erasing and writing unit comprises a storage space sufficient to hold the first data.

12. The data storage device of claim 11, wherein the one or more instructions, when executed by the at least one processor, are further configured to cause the data storage device to:

switch a state of the initial erasing and writing unit from an open state to a close state, switch a state of the alternative erasing and writing unit from an empty state or the close state to the open state, and store the first data in the alternative erasing and writing unit.

13. The data storage device of claim 12, wherein the one or more instructions, when executed by the at least one processor, are further configured to cause the data storage device to:

monitor valid data of an erasing and writing unit in the close state, and based on identifying that there is no valid data in the erasing and writing unit in the close state, reclaim data in the erasing and writing unit in the close state and switch the state of the erasing and writing unit in the close state to the empty state.

14. The data storage device of claim 12, wherein the one or more instructions, when executed by the at least one processor, are further configured to cause the data storage device to:

prioritize the erasing and writing unit in the close state as an object for reclamation.

15. The data storage device of claim 11, wherein both the initial erasing and writing unit and the alternative erasing and writing unit store data having a life cycle that is the same as the life cycle of the first data.

16. The data storage device of claim 10, wherein the first data comprises a log-structured merged tree file, and wherein a life cycle of the log-structured merged tree file is determined based on one or more of a heat classification, a level-based feature, and a file type of the log-structured merged tree file.

17. The data storage device of claim 16, wherein the file type of the log-structured merged tree file comprises a sorted string table file, a write ahead log file, and a remaining file, and the sorted string table file, the write ahead log file, and the remaining file are stored in different erasing and writing units, and wherein a life cycle of the sorted string table file is determined to be one of a plurality of life cycles based on at least one of the heat classification and the level-based feature of the log-structured merged tree file.

18. The data storage device of claim 10, wherein the first erasing and writing unit and the second erasing and writing unit correspond to a reclaim unit in a flexible data placement solid state drive, and wherein the one or more instructions, when executed by the at least one processor, are further configured to cause the data storage device to:

perform write operations of the reclaim unit using a reclaim unit handle corresponding to the reclaim unit, wherein the reclaim unit handle is set to a persistent isolation type.

19. A non-transitory computer readable medium having instructions stored therein, which when executed by at least one processor cause the at least one processor to execute a method of storing data, the method comprising:

based on identifying that first data stored in a first erasing and writing unit is to be moved, identifying a second erasing and writing unit as a destination for the first data; and moving the first data from the first erasing and writing unit to the second erasing and writing unit, wherein a life cycle of second data stored in the second erasing and writing unit before the first data is moved to the second erasing and writing unit is the same as a life cycle of the first data stored in the first erasing and writing unit.

20. The non-transitory computer readable medium of claim 19, wherein the method further comprises:

storing the first data in the first erasing and writing unit, wherein the storing the first data in the first erasing and writing unit comprises:

allocating an initial erasing and writing unit to the first data;

setting a switch flag of the initial erasing and writing unit to a first value or to a second value different from the first value, wherein the first value indicates that a storage space of the initial erasing and writing unit is sufficient to hold the first data, and the second value indicates that the storage space of the initial erasing and writing unit is insufficient to hold the first data;

based on the switch flag having the first value, storing the first data in the initial erasing and writing unit and identifying the initial erasing and writing unit as the first erasing and writing unit; and based on the switch flag having the second value, storing the first data in an alternative erasing and writing unit and identifying the alternative erasing and writing unit as the first erasing and writing unit, wherein the alternative erasing and writing unit is different from the initial erasing and writing unit and the alternative erasing and writing unit comprises a storage space sufficient to hold the first data.

* * * * *